United States Patent
Arikawa et al.

(10) Patent No.: US 11,637,636 B2
(45) Date of Patent: Apr. 25, 2023

(54) RECEIVING OPTICAL SYSTEM CONTROL DEVICE AND RECEIVING OPTICAL SYSTEM CONTROL METHOD

(71) Applicant: NEC Corporation, Tokyo (JP)

(72) Inventors: Manabu Arikawa, Tokyo (JP); Toshiharu Ito, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 17/613,149

(22) PCT Filed: May 13, 2020

(86) PCT No.: PCT/JP2020/019038
§ 371 (c)(1),
(2) Date: Nov. 22, 2021

(87) PCT Pub. No.: WO2020/241249
PCT Pub. Date: Dec. 3, 2020

(65) Prior Publication Data
US 2022/0224418 A1 Jul. 14, 2022

(30) Foreign Application Priority Data
May 31, 2019 (JP) .............................. JP2019-102288

(51) Int. Cl.
  *H04B 10/06* (2006.01)
  *H04B 10/61* (2013.01)
  *H04B 10/118* (2013.01)
(52) U.S. Cl.
  CPC ........... *H04B 10/61* (2013.01); *H04B 10/118* (2013.01)
(58) Field of Classification Search
  CPC .... H04B 10/61; H04B 10/118; H04B 10/616; H04B 10/6163; H04B 10/6165;
(Continued)

(56) References Cited

U.S. PATENT DOCUMENTS

| 2014/0126902 A1* | 5/2014 | Swanson | H04B 10/616 |
| | | | 398/43 |
| 2020/0044737 A1* | 2/2020 | Arikawa | H04B 10/65 |
| 2021/0083779 A1* | 3/2021 | Arikawa | H04B 10/614 |

FOREIGN PATENT DOCUMENTS

| JP | 2018-142873 A | 9/2018 |
| WO | 2017/141854 A1 | 8/2017 |

(Continued)

OTHER PUBLICATIONS

International Search Report for PCT Application No. PCT/JP2020/019038, dated Jul. 21, 2020.
(Continued)

*Primary Examiner* — Hanh Phan
(74) *Attorney, Agent, or Firm* — Sughrue Mion, PLLC

(57) ABSTRACT

A receiving optical system control device according to the present invention has: a light intensity calculation means for calculating, from a reception signal acquired by receiving, for each of plurality of mode light beams which are of the incident optical beams and which have been coupled to a plurality of propagation modes of the optical transmission medium by an optical system provided with a variable mechanism, the light intensity of each of the mode light beams; an optical phase calculation means for calculating the optical phase of each of the mode light beams from the reception signal; a relative phase calculation means for calculating the relative phase between the plurality of mode light beams from the optical phases; and a control amount calculation means for calculating the control amount of the variable mechanism from the light intensity and the relative phase.

20 Claims, 16 Drawing Sheets

(58) Field of Classification Search
CPC ............... H04B 10/671; H04B 10/672; H04B 10/1123; H04B 10/1143; H04B 10/1149; H04B 10/1121; H04B 10/40; H04B 10/2581; H04J 14/04
USPC ....... 398/118, 119, 121, 120, 123, 128, 129, 398/130, 131, 135, 136, 137, 202, 208, 398/209, 212, 213, 44, 143, 162, 204, 398/206, 207, 159
See application file for complete search history.

(56) References Cited

FOREIGN PATENT DOCUMENTS

| WO | 2016/180912 A1 | 10/2018 |
| WO | 2019/167237 A1 | 9/2019 |
| WO | 2020/189163 A1 | 9/2020 |

OTHER PUBLICATIONS

English translation of Written opinion for PCT Application No. PCT/JP2020/019038, dated Jul. 21, 2020.
Japanese Office Communication for JP Application No. 2021-522186 dated Nov. 22, 2022 with English Translation.

* cited by examiner

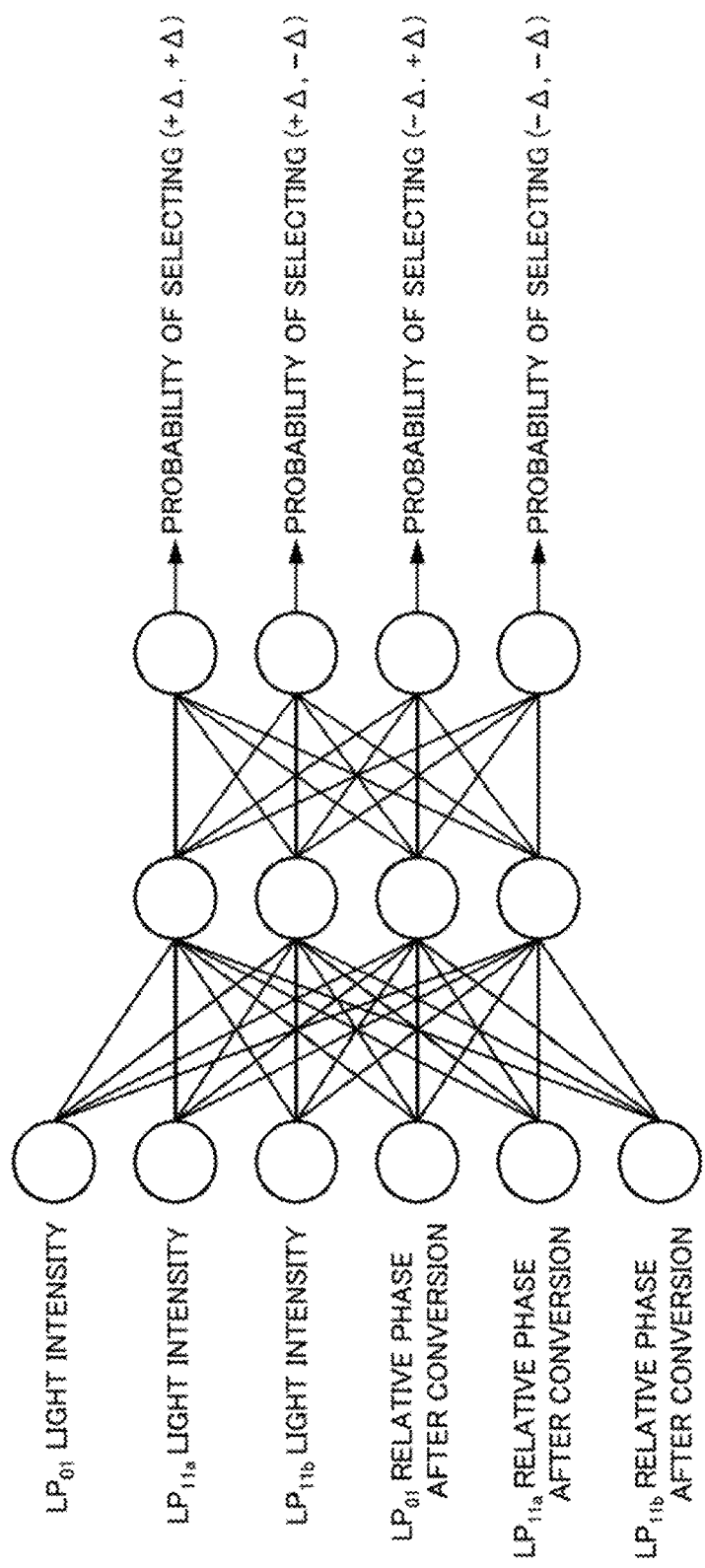

$LP_{01}$ $LP_{11a}$ $LP_{01}$ $LP_{11a}$ $LP_{01}$ $LP_{11a}$

RECEIVING OPTICAL SYSTEM CONTROL DEVICE AND RECEIVING OPTICAL SYSTEM CONTROL METHOD

This application is a National Stage Entry of PCT/JP2020/019038 filed on May 13, 2020, which claims priority from Japanese Patent Application 2019-102288 filed on May 31, 2019, the contents of all of which are incorporated herein by reference, in their entirety.

TECHNICAL FIELD

The present invention relates to a receiving optical system control device and a receiving optical system control method, particularly to a receiving optical system control device and a receiving optical system control method that are used in an optical space communication system.

BACKGROUND ART

In recent years, attention has been drawn to remote sensing for observing a wide geographic region from an artificial satellite, introduction of communication to an environment where a ground communication network is not developed, and the like. In view of this, a large-capacity communication link that connects an artificial satellite and the ground becomes important. In microwave communication that has hitherto been used, band utilization is greatly restricted in a legal and physical sense, and hence there is a limit to increase in communication capacity. Thus, optical space communication is drawing attention as a method which has substantially no restriction on band and is capable of achieving large capacity. Light having a wavelength extremely shorter than a microwave is used in the optical space communication, and hence high directivity can be secured while a transceiver device can be reduced in size and weight.

There are a plurality of candidates for wavelength bands to be used in the optical space communication. Optical space communication in which a wavelength band of 1.5 micrometers (μm), among the candidates, is used, has an advantage that a transmitting and receiving technique and a device that have been developed for optical fiber communication on the ground can be used for enabling high-speed and highly sensitive optical communication. In such optical space communication, a device based on a single mode fiber (SMF) is used, similarly to optical fiber communication on the ground. Thus, light transmitted from an artificial satellite or the like is required to be coupled to the single mode fiber (SMF) on a receiving side on the ground, which has an extremely small core diameter of approximately 10 micrometers (μm).

Incidentally, when an optical beam is propagated in the atmosphere covering the ground surface, a wave front thereof fluctuates due to atmospheric fluctuations. As a result, spatial coherence is limited, and coupling efficiency to the single mode fiber (SMF) greatly varies or is degraded. Occurrence of such fading is problematic in the optical space communication using the single mode fiber (SMF).

One of effective approaches for suppressing influence of the fading due to atmospheric fluctuations is to use a diversity reception system. In the diversity reception system, a plurality of receivers are prepared. Herein, when it is assumed that the atmospheric fluctuations have different influence on each optical signal being input to each of the receivers, the most appropriate output is selected among outputs from the plurality of receivers, and more generally, a plurality of reception signals are combined, and hence a probability of the fading occurring in the combined signal is reduced.

PTL 1 describes one example of an optical space communication receiver adopting such diversity reception system.

A related optical space communication receiver described in PTL 1 is a mode diversity type, and includes a few-mode fiber, a mode demultiplexer, a plurality of coherent receivers, a plurality of A/D converters (ADC), a local oscillator (LO), and a digital signal processing unit. The digital signal processing unit includes a relative delay compensation unit that performs relative delay compensation between reception signals, a relative phase compensation unit that performs relative phase compensation between the reception signals, and a maximum ratio combining unit that performs maximum ratio combining for the reception signals phases of which are aligned. Herein, a phase reference signal selection unit included in the relative phase compensation unit selects, from the reception signals, a signal with the best quality as a phase reference signal. As a result, it is claimed that, according to the related optical space communication receiver, combining can be performed with a phase relationship between the reception signals being aligned with high accuracy.

CITATION LIST

Patent Literature

[PTL 1] International Patent Publication No. WO2018/180912

SUMMARY OF INVENTION

Technical Problem

As described above, the related optical space communication receiver of a mode diversity type described in PTL 1 couples an optical beam to the few-mode fiber having a plurality of propagation modes, demultiplexes, by the mode demultiplexer, an optical signal coupled in each mode, and receives the demultiplexed optical signal. Then, diversity combining is performed in the digital signal processing. In this case, it can be regarded that influence of the atmospheric fluctuations on the optical signal coupled in each mode is independent in each mode or varies complementarily, and hence a diversity effect can suppress influence of the fading on the combined signal.

Herein, in the optical space communication, optical beams need to be received through an opening of approximately from a few centimeters (cm) to one meter (m) and the received incident optical beams need to be coupled to a core of an optical fiber (optical transmission medium) having a core diameter of approximately 10 micrometers (μm). Therefore, a coupling optical system for such a purpose is one of key functions relating to reception characteristics, and extremely accurate design and control are required. Further, it is required that the control of such a coupling optical system be performed at a speed sufficiently higher than a time scale of a phenomenon such as atmospheric fluctuations and shaking of a device, which may cause degradation of coupling efficiency.

However, in order to control such a coupling optical system with high accuracy at a high speed, incident optical beams need to be monitored with high accuracy at a high speed, which increases a cost of a receiver.

As described above, in the optical space communication, the optical system for coupling the incident optical beams to the optical transmission medium needs to be controlled with high accuracy at a high speed, and hence increase in cost of a receiver has been problematic.

An object of the present invention is to provide a receiving optical system control device and a receiving optical system control method that solve the above-mentioned problem, that is, in an optical space communication, an increase in cost of a receiver being caused by need of controlling, with high accuracy at a high speed, an optical system for coupling incident optical beams to an optical transmission medium.

Solution to Problem

A receiving optical system control device according to the present invention includes a light intensity calculation means for calculating light intensity of each mode optical beam from a reception signal acquired by receiving, for each mode optical beam, a plurality of mode optical beams being incident optical beams coupled to a plurality of propagation modes of an optical transmission medium by an optical system including a variable mechanism, an optical phase calculation means for calculating an optical phase of each of the mode optical beams from the reception signal, a relative phase calculation means for calculating a relative phase between the plurality of mode optical beams from the optical phase, and a control amount calculation means for calculating a control amount of the variable mechanism from the light intensity and the relative phase.

A receiving optical system control method according to the present invention includes acquiring a reception signal by receiving, for each mode optical beam, a plurality of mode optical beams being incident optical beams coupled to a plurality of propagation modes of an optical transmission medium by an optical system including a variable mechanism, calculating light intensity of each of the mode optical beams from the reception signal, calculating an optical phase of each of the mode optical beams from the reception signal, calculating a relative phase between the plurality of mode optical beams from the optical phase, and calculating a control amount of the variable mechanism from the light intensity and the relative phase.

Advantageous Effects of Invention

According to the receiving optical system control device and the receiving optical system control method of the present invention, in optical space communication, an optical system for coupling incident optical beams to an optical transmission medium is able to be controlled with high accuracy at a high speed without increasing a cost of a receiver.

BRIEF DESCRIPTION OF DRAWINGS

FIG. 4 is a diagram for describing an operation of a control amount calculation unit included in the optical receiving device according to the second example embodiment of the present invention.

EXAMPLE EMBODIMENT

Example embodiments according to the present invention are described below with reference to the drawings.

First Example Embodiment

Figure 1:
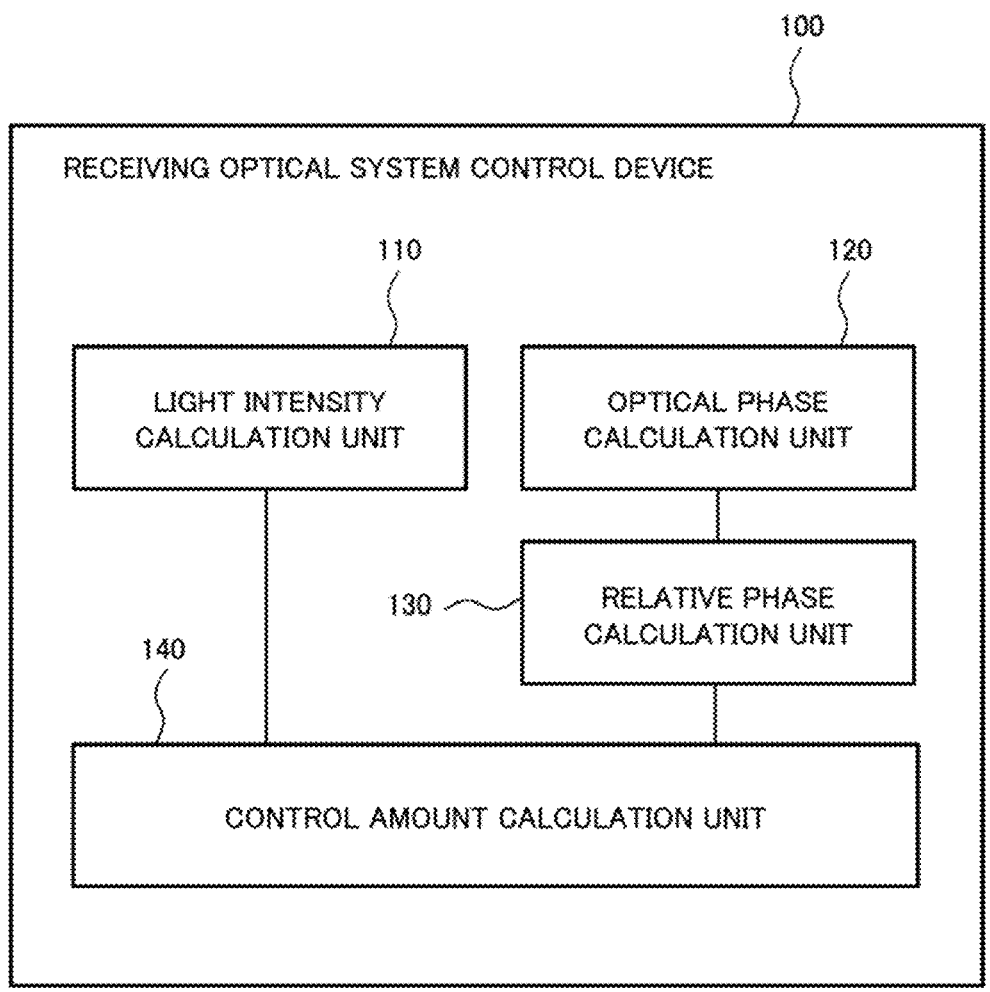
FIG. 1 is a block diagram illustrating a configuration of a receiving optical system control device according to a first example embodiment of the present invention.

FIG. 1 is a block diagram illustrating a configuration of a receiving optical system control device 100 according to a first example embodiment of the present invention.

The receiving optical system control device 100 includes a light intensity calculation unit (light intensity calculation means) 110, an optical phase calculation unit (optical phase calculation means) 120, a relative phase calculation unit (relative phase calculation means) 130, and a control amount calculation unit (control amount calculation means) 140.

The light intensity calculation unit 110 calculates light intensity of each mode optical beam from a reception signal acquired by receiving, for each mode optical beam, a plurality of mode optical beams being incident optical beams coupled to a plurality of propagation modes of an optical transmission medium by an optical system including a variable mechanism. The optical phase calculation unit 120 calculates an optical phase of each mode optical beam from the reception signal. The relative phase calculation unit 130 calculates a relative phase between the plurality of mode optical beams from the optical phase. Then, the control amount calculation unit 140 calculates a control amount of the variable mechanism from the light intensity and the relative phase.

In this manner, the receiving optical system control device 100 according to the present example embodiment has a configuration in which the control amount calculation unit 140 calculates the control amount of the variable mechanism from the light intensity and the relative phase. Thus, the optical system including the variable mechanism can be controlled with high accuracy at a high speed without monitoring the incident optical beams. Specifically, with the receiving optical system control device 100 according to the present example embodiment, in the optical space communication, the optical system for coupling the incident optical beams to the optical transmission medium can be controlled with high accuracy at a high speed without increasing the cost of a receiver.

Herein, the control amount calculation unit 140 may have a configuration of calculating the control amount for maximizing total coupling efficiency being a total sum of coupling efficiency of the incident optical beams to each of the plurality of propagation modes. Further, the relative phase calculation unit 130 may have a configuration of calculating the relative phase with a phase in a basic mode as a reference among the plurality of mode optical beams.

Next, a receiving optical system control method according to the present example embodiment is described.

In the receiving optical system control method according to the present example embodiment, first, the reception signal is acquired by receiving, for each mode optical beam, the plurality of mode optical beams being the incident optical beams coupled in the plurality of propagation modes of the optical transmission medium by the optical system including the variable mechanism. The light intensity of each mode optical beam is calculated from the reception signal. Further, the optical phase of each mode optical beam is calculated from the reception signal. Then, the relative phase between the plurality of mode optical beams is calculated from the optical phase. Finally, the control amount of the variable mechanism is calculated from the light intensity and the relative phase.

With this configuration, the optical system including the variable mechanism can be controlled with high accuracy at a high speed without monitoring the incident optical beams.

Herein, calculation of the control amount described above is regarded as calculation of the control amount for maximizing the total coupling efficiency being a total sum of coupling efficiency of the incident optical beams to each of the plurality of propagation modes. Further, calculation of the relative phase described above is regarded as calculation of the relative phase with the phase in the basic mode as a reference among the plurality of mode optical beams.

As described above, with the receiving optical system control device 100 and the receiving optical system control method according to the present example embodiment, in the optical space communication, the optical system for coupling the incident optical beams to the optical transmission medium can be controlled with high accuracy at a high speed without increasing the cost of a receiver.

Second Example Embodiment

Figure 2:
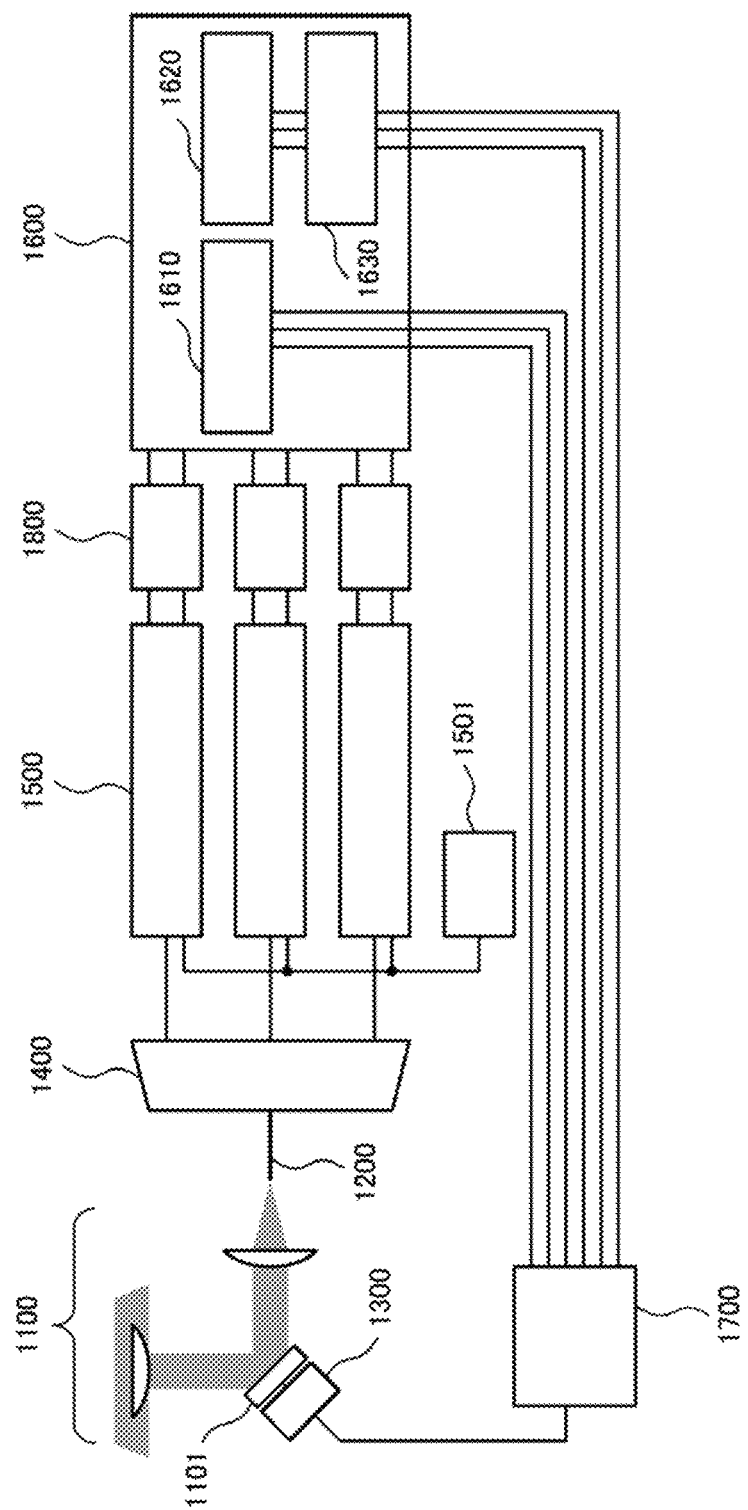
FIG. 2 is a block diagram illustrating a configuration of an optical receiving device according to a second example embodiment of the present invention.

Next, a second example embodiment of the present invention is described. FIG. 2 illustrates a configuration of an optical receiving device 1000 according to the present example embodiment. The optical receiving device 1000 is a receiver that is used in the optical space communication and adopts a mode diversity reception system, and includes a control mechanism of a receiving optical system.

The optical receiving device 1000 according to the present example embodiment at least includes an optical system 1100, an optical transmission medium 1200, a coupling control device (coupling control means) 1300, a mode demultiplexer (mode demultiplexing means) 1400, an optical receiver (optical receiving means) 1500, a signal processing device 1600, and a control amount calculation unit 1700. Herein, the signal processing device 1600 includes a light intensity calculation unit 1610, an optical phase calculation unit 1620, and a relative phase calculation unit 1630. Note that, the light intensity calculation unit 1610, the optical phase calculation unit 1620, the relative phase calculation unit 1630, and the control amount calculation unit 1700 have the similar configurations to those in the first example embodiment, and constitute the receiving optical system control device.

The coupling control device 1300 controls a variable mechanism 1101 included in the optical system 1100, based on a control amount calculated by the control amount calculation unit 1700, and couples the incident optical beams in the plurality of propagation modes of the optical transmission medium 1200. The mode demultiplexer 1400 demultiplexes the plurality of mode optical beams coupled in the plurality of propagation modes of the optical transmission medium 1200, and outputs each mode optical beam. Then, the optical receiver 1500 receives each mode optical beam, and generates a reception signal.

The optical system 1100 includes a mirror, and the variable mechanism 1101 is configured to rotate the mirror about an axis. In this case, a control amount of the variable mechanism 1101 is a rotation amount of the mirror about the axis. In general, the optical transmission medium 1200 is a few-mode fiber (FMF) having a small number of propagation modes. Further, the optical receiver 1500 has a configuration of performing wave coherence detection by causing each mode optical beam and a local oscillation optical beam to interfere with each other. FIG. 2 illustrates a configuration which includes a local oscillator 1501 that outputs a local oscillation optical beam and which performs coherence detection.

Next, an operation of the optical receiving device 1000 according to the present example embodiment is described.

An optical beam entering a reception telescope has optical axes controlled by the coupling control device 1300, and is coupled to the few-mode fiber being the optical transmission medium 1200 through a coupling lens. The coupling control device 1300 is capable of adjusting inclination of a mirror with high accuracy at a high speed by controlling the variable mechanism 1101. For example, the optical axes of the optical beam can be adjusted by using, for example, one mirror and controlling inclination in a horizontal direction (X-axis) and a vertical direction (Y-axis) of the mirror. Specifically, the coupling control device 1300 adjusts a rotation amount about the X-axis and a rotation amount of the Y-axis for the mirror. Note that, more in general, the optical axes of the optical beam can be freely adjusted within a certain range by using two mirrors and adjusting inclination in the X-axis directions and the Y-axis directions of the mirrors.

The optical beam coupled to the few-mode fiber is demultiplexed by the mode demultiplexer 1400 according to modes, and is introduced into the optical receiver 1500 being a receiver based on a single-mode fiber (SMF). In the present example embodiment, the mode demultiplexer 1400 demultiplexes the optical beam coupled in three linearly-polarized (LP) modes including $LP_{01}$, $LP_{11a}$, and $LP_{11b}$.

Herein, cross talk between the modes in the few-mode fiber and in the mode demultiplexer 1400 is negligibly small, and an insertion loss is also small. In general, coupling between the modes during propagation in the few-mode fiber cannot be ignored between the $LP_{11b}$ mode and the $LP_{11a}$ mode where degeneration is particularly conspicuous. However, for example, it has been reported that, when the few-mode fiber has a core formed in an oval shape, coupling between modes including a mode with degeneration during propagation in the fiber can also be suppressed.

Each mode optical beam acquired after demultiplexing according to the modes is received by the optical receiver 1500 being a receiver based on a single-mode fiber (SMF). Then, each reception signal is subjected to sampling by an analog-to-digital converter (ADC) 1800, and then is synthesized by the signal processing device 1600 through digital signal processing. With this configuration, coherent reception and coherent synthesizing are performed, and maximum reception performance can be achieved in a theoretical sense.

There may be adopted a configuration of arranging an optical amplifier between the mode demultiplexer 1400 and each optical receiver 1500 and amplifying each mode optical beam. A main noise source in the optical receiving device 1000 is amplified light that is naturally emitted from the optical amplifier when the optical amplifier is used, and shot noise is a main noise source when the optical amplifier is not used. In either case, it is desired that the optical receiver 1500 and the optical amplifier that are used for each mode optical beam have uniform characteristics for the purpose of calculating intensity of the light coupled in each mode with high accuracy.

The signal processing device 1600 synthesizes the reception signal received in each mode. Further, the light intensity calculation unit 1610 included in the signal processing device 1600 calculates light intensity of light (mode optical beam) coupled to each mode, and the optical phase calculation unit 1620 calculates an optical phase (carrier phase) of a carrier wave (carrier) of each mode optical beam. The light intensity in each mode optical beam is in proportion to a signal-to-noise ratio of the reception signal in each mode. Therefore, a loss or the like inside each optical receiver 1500 is equalized, a signal-to-noise ratio is estimated for the reception signal in each mode, and thus intensity of the light coupled in each mode can be estimated. For estimation of a signal-to-noise ratio, an estimation method using a second moment and a fourth moment may be used.

The carrier phase of each mode optical beam can be calculated by subjecting the reception signal in each mode to carrier phase estimation by a general M multiplication or the like.

Figure 3:
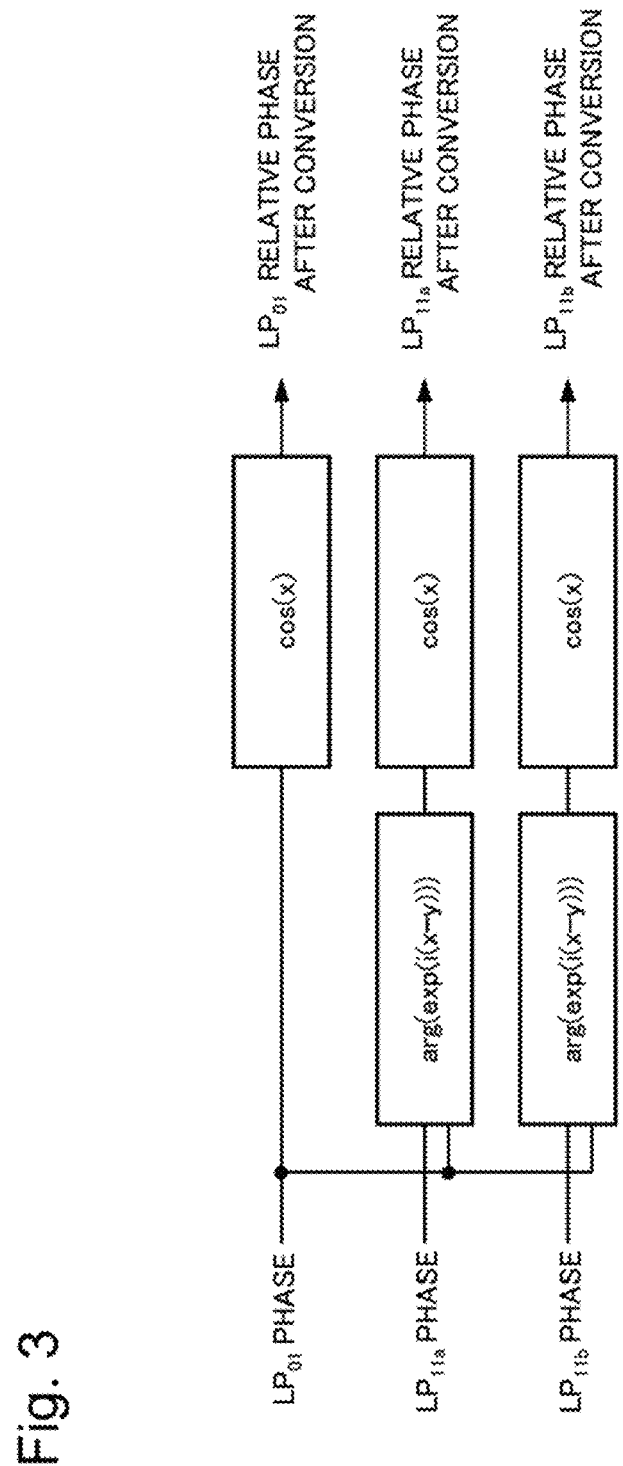
FIG. 3 is a diagram for describing an operation of a relative phase calculation unit included in the optical receiving device according to the second example embodiment of the present invention.

The relative phase calculation unit 1630 included in the signal processing device 1600 converts the carrier phase of each mode optical beam into a relative phase with the carrier phase in the $LP_{01}$ mode being a basic mode as a reference. FIG. 3 illustrates an operation of the relative phase calculation unit 1630 in this stage. In the present example embodiment, as illustrated in FIG. 3, the relative phase calculation unit 1630 has a configuration in which a result acquired by subjecting the relative phase between the plurality of mode optical beams to cosine (cos) calculation is regarded as a relative phase (relative phase after conversion). With this, influence of discontinuity of $2\pi$ appearing in a phase expressed as a main value of an argument (arg) can be avoided.

In this manner, the signal processing device 1600 calculates the light intensity of the incident optical beam (mode optical beam) coupled in each mode and the relative phase of each mode optical beam after conversion with respect to the basic mode. The light intensity and the relative phase that are thus calculated are input to the control amount calculation unit 1700.

Based on the light intensity in each mode and the relative phase after conversion with respect to the basic mode that are input, the control amount calculation unit 1700 calculates the control amount of the variable mechanism 1101 for the mirror. Based on the control amount, the coupling control device 1300 controls inclination of the mirror in the X-axis and Y-axis directions.

Herein, when the incident optical beams are to be coupled appropriately in the plurality of propagation modes of the optical transmission medium 1200, an appropriate relationship between the light intensity in each mode and the relative phase after conversion with respect to the basic mode that are input, and the control amount for controlling inclination of the mirror in the X-axis and Y-axis directions needs to be acquired. In view of this, the optical receiving device 1000 according to the present example embodiment has a configuration in which the control amount calculation unit 1700 models the relationship between the light intensity and the relative phase, and the control amount by a neural network. Specifically, there is adopted a configuration in which the control amount is calculated by using a parameter indicating coupling between an input layer and an output layer when the light intensity and the relative phase are regarded as the input layer, and a selection probability of an adjustment amount with respect to the control amount is regarded as the output layer. Then, the control amount calculation unit 1700 optimizes the parameter by reinforcement learning.

For simplification of the description, it is assumed that the control amount calculation unit 1700 changes a control amount (X, Y) for inclination of the mirror by an adjustment amount ($\Delta X$, $\Delta Y$) and that an action to be possibly taken is limited to four types including ($+\Delta$, $+\Delta$), ($+\Delta$, $-\Delta$), ($-\Delta$, $+\Delta$), and ($-\Delta$, $-\Delta$). When an action is discrete, a probability of selecting a certain action under a certain condition, that is, an expression of a policy by the neural network is as illustrated in FIG. 4.

In this neural network model, a feature vector x is acquired by aligning the light intensity in each mode and the relative phase after conversion with respect to the basic mode, and a probability $\pi(a_j|x)$ of selecting an action $a_j$ with an input x is output. A weight and a bias of coupling in each layer indicate a parameter vector $\theta$ that describes the model. The control amount calculation unit 1700 optimizes the parameter vector $\theta$ by reinforcement learning, and executes desired control.

In the neural network illustrated in FIG. 4, when an output of a layer 1 is vectorized and expressed as a[1], the neural network is expressed as in Expressions (1) and (2) given below. Herein, a layer 0 is an input, and a[0]=x is satisfied.

$$z^{[l]} = W^{[l]}a^{[l-1]} + b^{[l]} \quad (1)$$

$$a^{[l]} = g^{[l]}(z^{[l]}) \quad (2)$$

W[1] and b[1] in Expression (1) indicate a weighting factor and a bias, respectively, and g[1] in Expression (2) is an activating function. As an activating function of a hidden layer of the neural network described above, a general rectified linear unit (ReLU) function expressed in Expression (3) given below may be used.

$$g(z) = \begin{cases} z & (z \geq 0) \\ 0 & (z < 0) \end{cases} \quad (3)$$

Further, a probability of selecting each action needs to be output in the output layer, and hence a Softmax function expressed in Expression (4) given below may be used as an activating function.

$$a_i^{[L]} = \frac{\exp(z_i^{[L]})}{\sum_j \exp(z_j^{[L]})} \quad (4)$$

According to Expressions (1) to (4), when an output from the input layer to the next layer is sequentially calculated, the probability $\pi(a_j|x)$ of selecting each action in a case where the feature vector x is input can be calculated.

The control amount calculation unit 1700 may use, as a reward of the reinforcement learning, the total coupling efficiency being the target itself to be maximized for the best reception performance. Herein, the total coupling efficiency is a total sum of coupling efficiency of the incident optical beams in the plurality of propagation modes.

Further, the control amount calculation unit 1700 may use, as the reinforcement learning, a policy gradient method. In this case, the control amount calculation unit 1700 updates the parameter $\theta$ according to Expression (5) given below, by using a gain G being a total reward.

$$\theta_{t+1} = \theta_t + \alpha G_t \nabla_\theta \log\pi(a_t|s_t, \theta_t) \quad (5)$$

$\alpha$ in Expression (5) is a parameter that determines an update magnitude. With this, ideally, control for maximizing a reward according to an input state can be executed.

As described above, with the optical receiving device 1000 according to the present example embodiment, in the optical space communication, the optical system for coupling the incident optical beams to the optical transmission medium can be controlled with high accuracy at a high speed without increasing the cost of a receiver.

Next, description is given on the fact that the light intensity of the mode optical beam coupled in each mode and the relative phase after conversion with the basic mode as a reference can be used as feature amounts for optimally controlling the mirror included in the optical system.

Figure 5A:
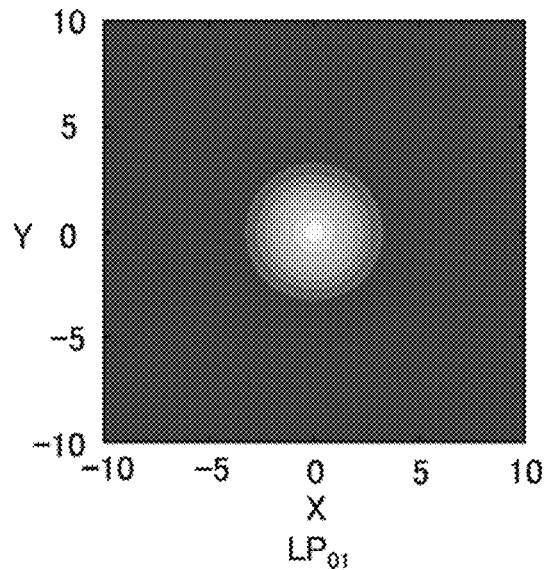
FIG. 5A is a diagram for describing an operation of the control amount calculation unit included in the optical receiving device according to the second example embodiment of the present invention, and is a diagram illustrating a simulation result regarding coupling efficiency in a $LP_{01}$ mode.
Figure 5B:
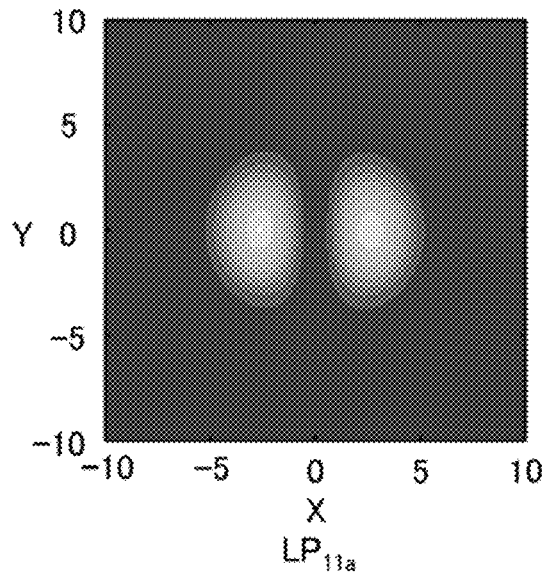
FIG. 5B is a diagram for describing an operation of the control amount calculation unit included in the optical receiving device according to the second example embodiment of the present invention, and is a diagram illustrating a simulation result regarding coupling efficiency in a $LP_{11a}$ mode.
Figure 5C:
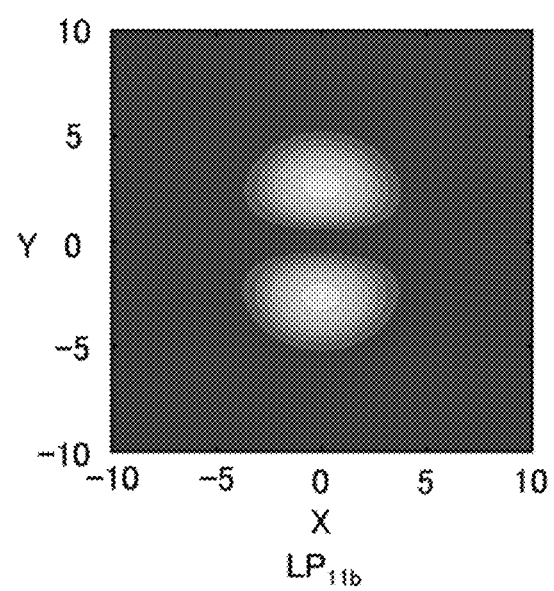
FIG. 5C is a diagram for describing an operation of the control amount calculation unit included in the optical receiving device according to the second example embodiment of the present invention, and is a diagram illustrating a simulation result regarding coupling efficiency in a $LP_{11b}$ mode.

Each of FIGS. 5A, 5B, and 5C illustrates a result acquired by simulating a relationship between the control amount (X, Y) indicating inclination of the mirror and the coupling efficiency in each LP mode when a received optical beam is coupled to the few-mode fiber under conditions free from atmospheric fluctuations. FIGS. 5A, 5B, and 5C illustrate coupling efficiency in the $LP_{01}$ mode, coupling efficiency in the $LP_{11a}$ mode, and coupling efficiency in the $LP_{11b}$ mode, respectively. In each drawing, the whiter color indicates the higher coupling efficiency. Herein, the control amount (X, Y) indicating inclination of the mirror indicates a rotation amount about the X-axis and a rotation amount about the Y-axis.

In the simulation, an ideal optical beam without a beam positional shift is Zernike-coefficient developed, and the control amount (X, Y) indicating inclination of the mirror is given as a control amount of a Zernike coefficient component having a degree of 1. After that, overlap integration with a space profile of an electric field in each LP mode is performed. Then, the light intensity (coupling intensity) of light coupled in each LP mode is calculated from an absolute value of the integration result, and the carrier phase (coupling phase) of light coupled in each LP mode is calculated from the phase.

From FIGS. 5A to 5C, it is understood that the coupling efficiency reflects the shape of the space profile in each LP mode. Specifically, as seen from FIG. 5A, the coupling efficiency in $LP_{01}$ has a unimodal shape having a peak at the control amount (0, 0). In contrast, as seen from FIGS. 5B and 5C, the coupling efficiency to $LP_{11a/b}$ has a shape having two peaks at positions slightly away from the center in the X/Y-axis, respectively.

Figure 6A:
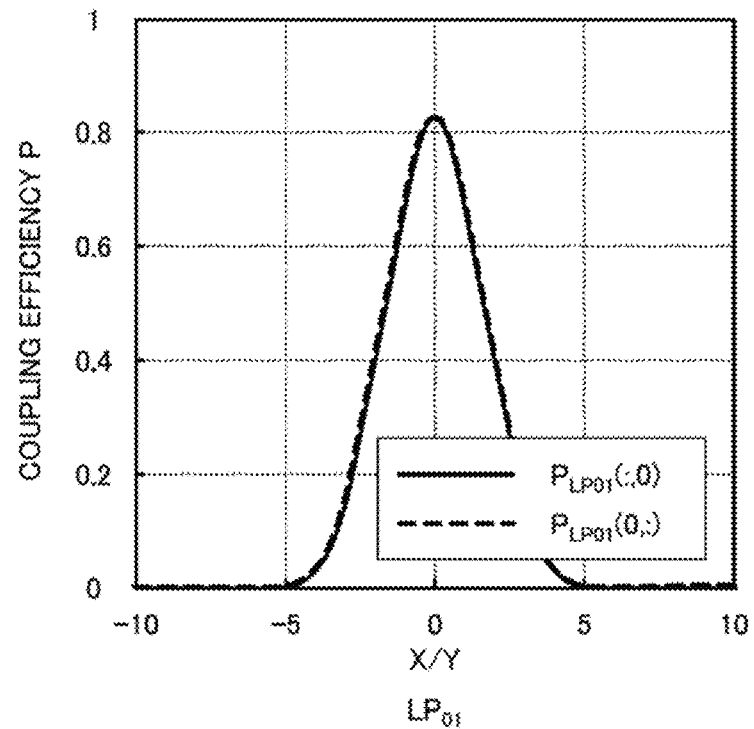
FIG. 6A is a diagram for describing an operation of the control amount calculation unit included in the optical receiving device according to the second example embodiment of the present invention, and is a diagram illustrating a result shown by plotting the coupling efficiency in the $LP_{01}$ mode with respect to a control amount.
Figure 6B:
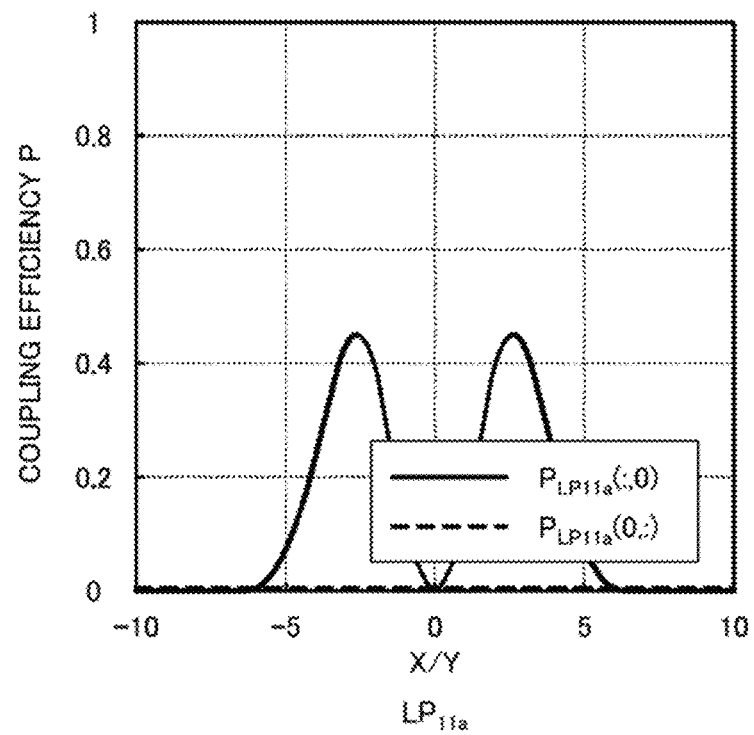
FIG. 6B is a diagram for describing an operation of the control amount calculation unit included in the optical receiving device according to the second example embodiment of the present invention, and is a diagram illustrating a result shown by plotting the coupling efficiency in the $LP_{11a}$ mode with respect to a control amount.
Figure 6C:
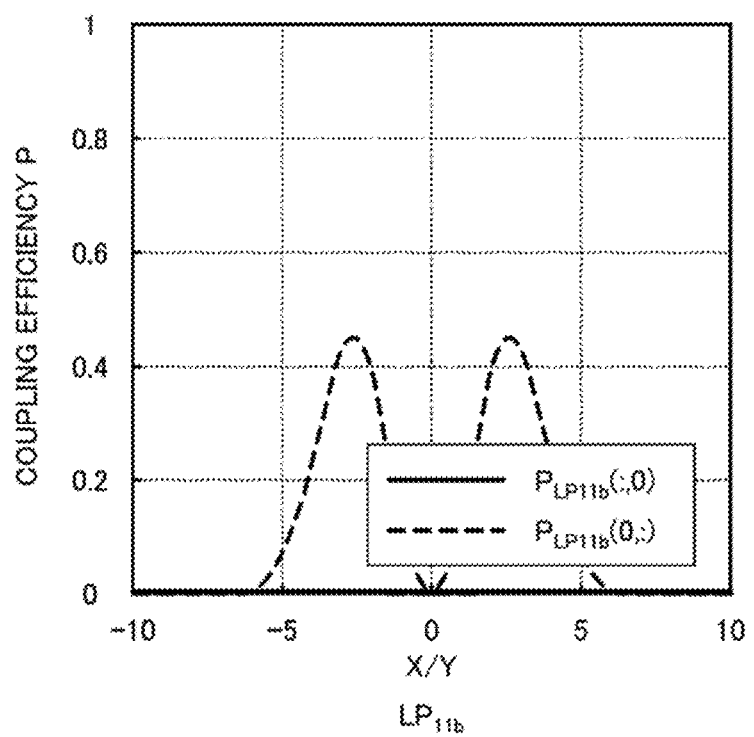
FIG. 6C is a diagram for describing an operation of the control amount calculation unit included in the optical receiving device according to the second example embodiment of the present invention, and is a diagram illustrating a result shown by plotting the coupling efficiency in the $LP_{11b}$ mode with respect to a control amount.

Each of FIGS. 6A to 6C illustrates a result acquired by plotting a change of the coupling efficiency in each LP mode with respect to the control amount in the X-axis or the Y-axis. In each drawing, the solid line indicates a change of coupling efficiency P with respect to a control amount in the X-axis when Y=0 is satisfied, that is, a change of coupling efficiency P when the mirror is rotated about the X-axis with a rotation amount about the Y-axis being 0. Meanwhile, the broken line indicates a change of coupling efficiency P with respect to a control amount in the Y-axis when X=0 is satisfied, that is, a change of coupling efficiency P when the mirror is rotated about the Y-axis with a rotation amount about the X-axis being 0.

From FIGS. 6A to 6C, it is understood that, for example, when the control amount is shifted in the X-axis direction, degradation of the coupling efficiency in the $LP_{01}$ mode and increase of the coupling efficiency in the $LP_{11a}$ mode are caused within a certain range. In other words, a situation where the coupling efficiency in the $LP_{01}$ mode is low and the coupling efficiency in the $LP_{11a}$ mode is high indicates that the control amount in the X-axis direction is highly likely to be shifted. Similarly, from the coupling efficiency in the $LP_{11b}$ mode, it can be determined, within a certain range, whether the control amount in the Y-axis direction is shifted.

However, the beam profile in the LP mode has a rotation symmetry, and hence, as illustrated in FIGS. 5A to 5C, the relationship between the control amount for inclination of the mirror and the coupling efficiency in each LP mode accordingly has a rotation symmetry. Thus, even when it is determined that the control amount is shifted in the X-axis direction, information regarding a sign (positive or negative) of the shifted amount cannot be acquired. In view of this, the fact that space distribution of the phase of the electrical field of each of the $LP_{11a}$ mode and the $LP_{11b}$ mode has parity and the rotation symmetry collapses is focused on, and the fact is used as information for control.

Figure 7A:
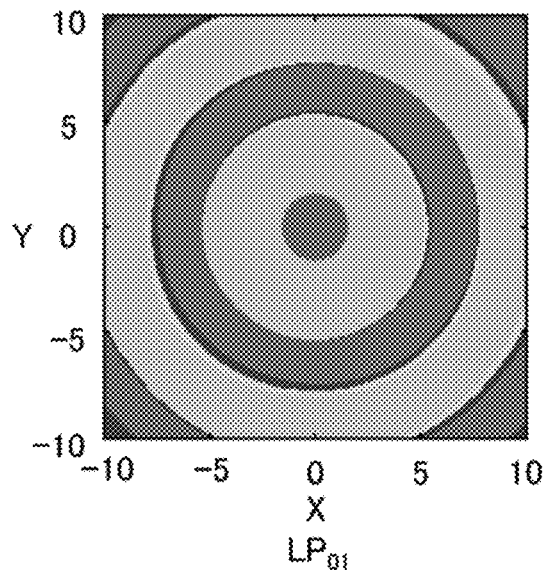
FIG. 7A is a diagram for describing an operation of the control amount calculation unit included in the optical receiving device according to the second example embodiment of the present invention, and is a diagram illustrating a simulation result regarding a coupling phase in the $LP_{01}$ mode.
Figure 7B:
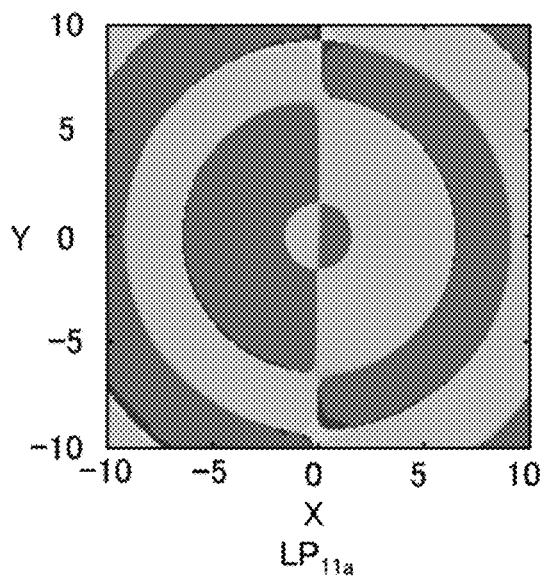
FIG. 7B is a diagram for describing an operation of the control amount calculation unit included in the optical receiving device according to the second example embodiment of the present invention, and is a diagram illustrating a simulation result regarding a coupling phase in the $LP_{11a}$ mode.
Figure 7C:
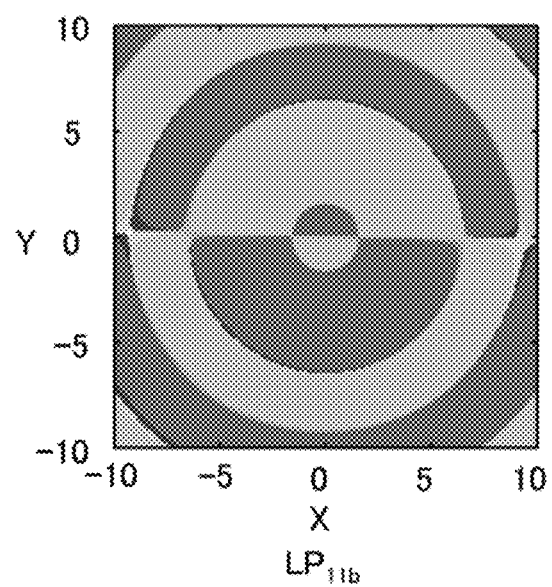
FIG. 7C is a diagram for describing an operation of the control amount calculation unit included in the optical receiving device according to the second example embodiment of the present invention, and is a diagram illustrating a simulation result regarding a coupling phase in the $LP_{11b}$ mode.

Each of FIGS. 7A to 7C illustrates a result acquired by simulating a relationship between the control amount (X, Y) indicating inclination of the mirror and the coupling phase in each LP mode when, similarly to FIGS. 5A to 5C, a received optical beam is coupled to the few-mode fiber under conditions free from atmospheric fluctuations. FIGS. 7A, 7B, and 7C illustrate the coupling phase in the $LP_{01}$ mode, the coupling phase in the $LP_{11a}$ mode, and the coupling phase in the $LP_{11b}$ mode, respectively.

Figure 8A:
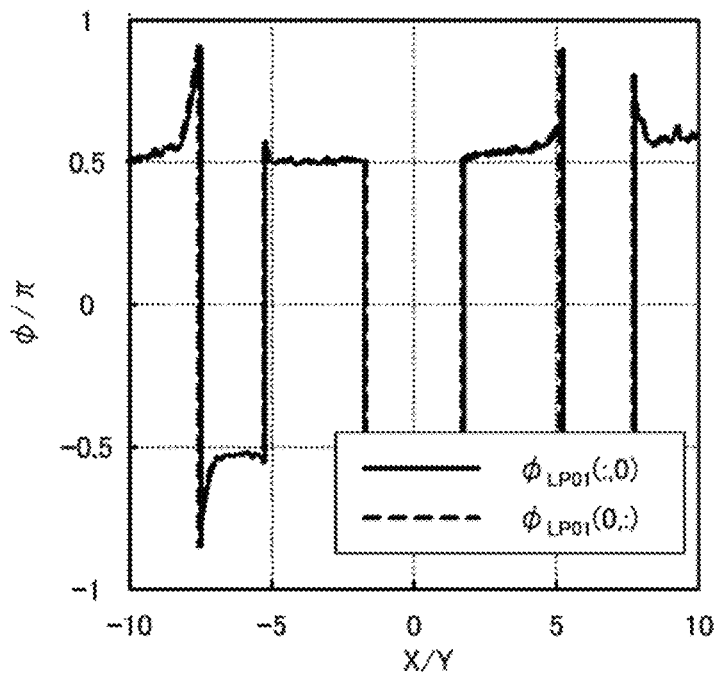
FIG. 8A is a diagram for describing an operation of the control amount calculation unit included in the optical receiving device according to the second example embodiment of the present invention, and is a diagram illustrating a result shown by plotting the coupling phase in the $LP_{01}$ mode with respect to a control amount.
Figure 8B:
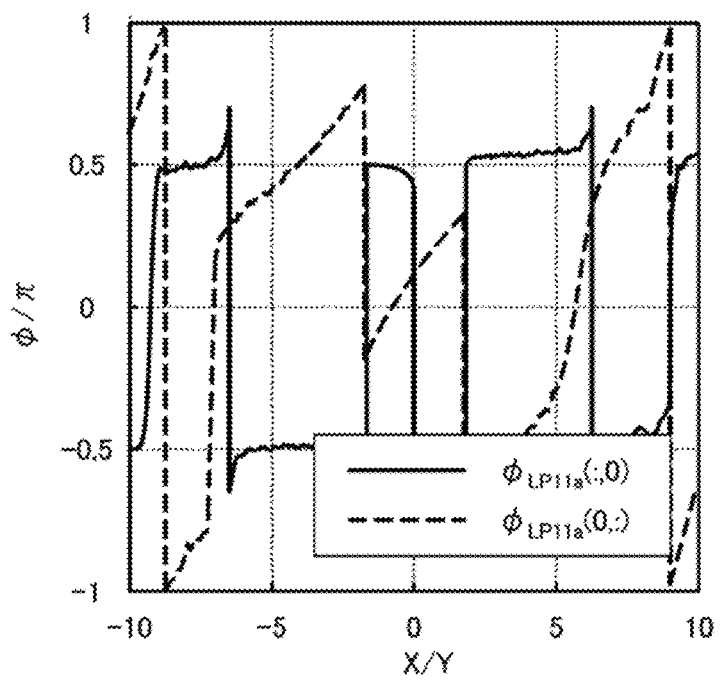
FIG. 8B is a diagram for describing an operation of the control amount calculation unit included in the optical receiving device according to the second example embodiment of the present invention, and is a diagram illustrating a result shown by plotting the coupling phase in the $LP_{11a}$ mode with respect to a control amount.
Figure 8C:
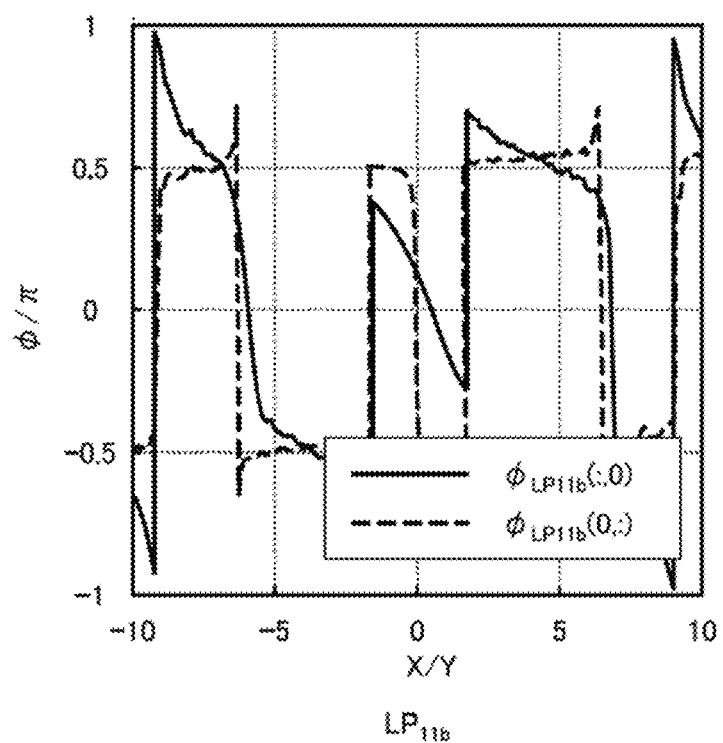
FIG. 8C is a diagram for describing an operation of the control amount calculation unit included in the optical receiving device according to the second example embodiment of the present invention, and is a diagram illustrating a result shown by plotting the coupling phase in the $LP_{11b}$ mode with respect to a control amount.

Each of FIGS. 8A to 8C illustrates a result acquired by plotting a change of the coupling phase in each LP mode with respect to the control amount in the X-axis or the Y-axis. In each drawing, the vertical axis indicates a numerical value acquired by dividing a coupling phase φ in radians by π, and takes a value from −1 to +1. Further, the solid line indicates a change of the coupling phase φ with respect to the control amount in the X-axis when Y=0 is satisfied, that is, a change of the coupling phase φ when the mirror is rotated about the X-axis with a rotation amount about the Y-axis being 0. Meanwhile, the broken line indicates a change of the coupling phase φ with respect to the control amount in the Y-axis when X=0 is satisfied, that is, a change of the coupling phase φ when the mirror is rotated about the Y-axis with a rotation amount about the X-axis being 0.

From FIG. 7A, it is understood that, similarly to the coupling efficiency, the coupling phase in the $LP_{01}$ mode has a rotation symmetry. However, from FIG. 8B, it is understood that, for example, the coupling phase in $LP_{11a}$ takes a value of −π/2 in the positive area and a value of +π/2 in the negative area in the X-axis within a certain range during the change in the X-axis direction (indicated by the solid line), which indicates collapse of symmetry. This also indicates that the information relating to the coupling phase contains information for specifying not only a shifting direction of the control amount but also a sign (positive or negative) thereof. Similarly, from FIG. 8C, it is understood that information relating to a sign (positive or negative) of the shifting of the control amount in the Y-axis direction can be acquired within a certain range from the coupling phase in the $LP_{11b}$ mode. Note that, with regard to the change of the coupling phase to the $LP_{11a}$ mode in the Y-axis (indicated by the broken line in FIG. 8B) and the change of the coupling phase to the $LP_{11b}$ mode in the X-axis (indicated by the solid line in FIG. 8C), originally under the conditions, the coupling efficiency is substantially zero, and hence the coupling phases within the ranges substantially cannot be used.

When the information relating to the coupling intensity and the information relating to the coupling phase described above are used in combination, a shifting amount of the control amount can be estimated. However, as seen from FIGS. 6A to 6C, for example, the shift of the control amount in the X-axis direction within a certain range causes degradation of the coupling efficiency to the $LP_{01}$ mode and increase of the coupling efficiency to the $LP_{11a}$ mode, and the coupling efficiency to the $LP_{11a}$ mode is also degraded when a shift exceeding a certain range is caused. Thus, determination of the control amount for inclination of the mirror when information relating to freely-selected coupling intensity and a coupling phase is acquired is too complex to immediately describe rules therefor. In view of this, in the present example embodiment, the relationship between the coupling intensity and the coupling phase, and the control amount is modeled by the neural network and described, and a configuration in which the control amount is acquired by subjecting the total coupling efficiency to be maximized as a reward to reinforcement learning is adopted.

As described above, in the relationship between the control amount for inclination of the mirror and the coupling phases in the $LP_{11a}$ mode and the $LP_{11b}$ mode, a value is −π/2 in the positive area in the X-axis, and a value is +π/2 in the negative area within a certain range near the center. Therefore, within this range, the information relating to a sign (positive or negative) of the shifted control amount can be acquired, but a discontinuous change is caused again outside the range. Thus, the coupling phases in the $LP_{11a}$ mode and the $LP_{11b}$ mode themselves are not suitable to use as information for control.

In view of this, in the present example embodiment, instead of the coupling phases themselves, a relative phase with the coupling phase in the $LP_{01}$ mode being a basic mode as a reference is used, and thus the area near the center where the information relating to a sign (positive or negative) of the shifted control amount can be acquired is increased. Further, the relative phase thus acquired herein is subjected to cosine (cos) calculation, and thus influence of discontinuity caused by $2\pi$ appearing in the phase can be avoided.

Figure 9A:
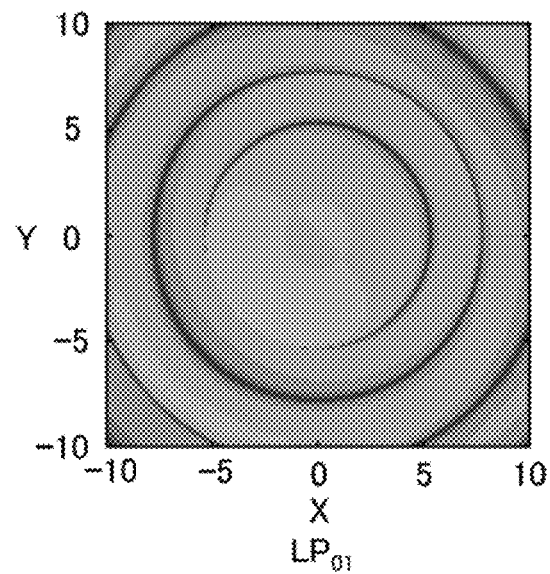
FIG. 9A is a diagram for describing an operation of the control amount calculation unit included in the optical receiving device according to the second example embodiment of the present invention, and is a diagram illustrating a simulation result of a relative phase in the $LP_{01}$ mode.
Figure 9B:
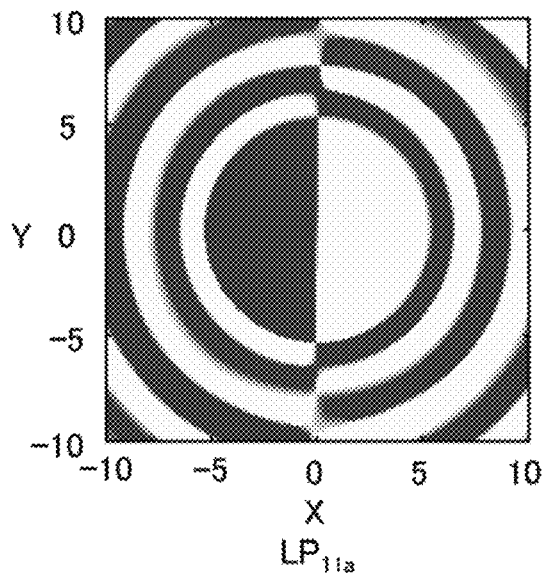
FIG. 9B is a diagram for describing an operation of the control amount calculation unit included in the optical receiving device according to the second example embodiment of the present invention, and is a diagram illustrating a simulation result of a relative phase in the $LP_{11a}$ mode.
Figure 9C:
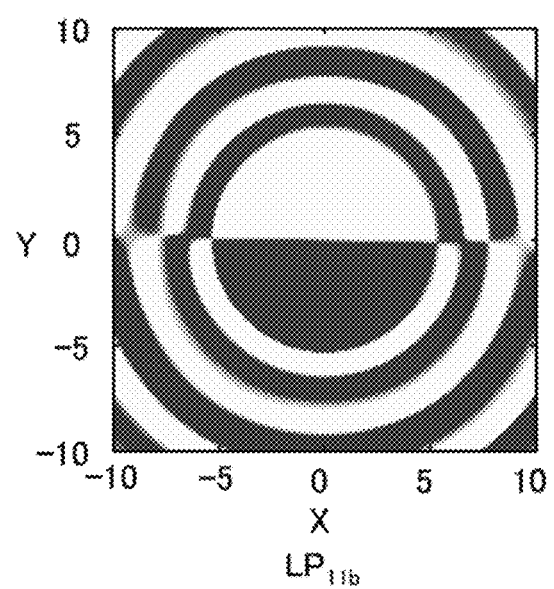
FIG. 9C is a diagram for describing an operation of the control amount calculation unit included in the optical receiving device according to the second example embodiment of the present invention, and is a diagram illustrating a simulation result of a relative phase in the $LP_{11b}$ mode.

Each of FIGS. 9A to 9C illustrates a result acquired by simulating a relationship between the control amount (X, Y) indicating inclination of the mirror and the relative phase in each LP mode when, similarly to FIGS. 7A to 7C, a received optical beam is coupled to the few-mode fiber under conditions free from atmospheric fluctuations. FIGS. 9A, 9B, and 9C illustrate the relative phase in the $LP_{01}$ mode, the relative phase in the $LP_{11a}$ mode, and the relative phase in the $LP_{11b}$ mode, respectively.

Figure 10A:
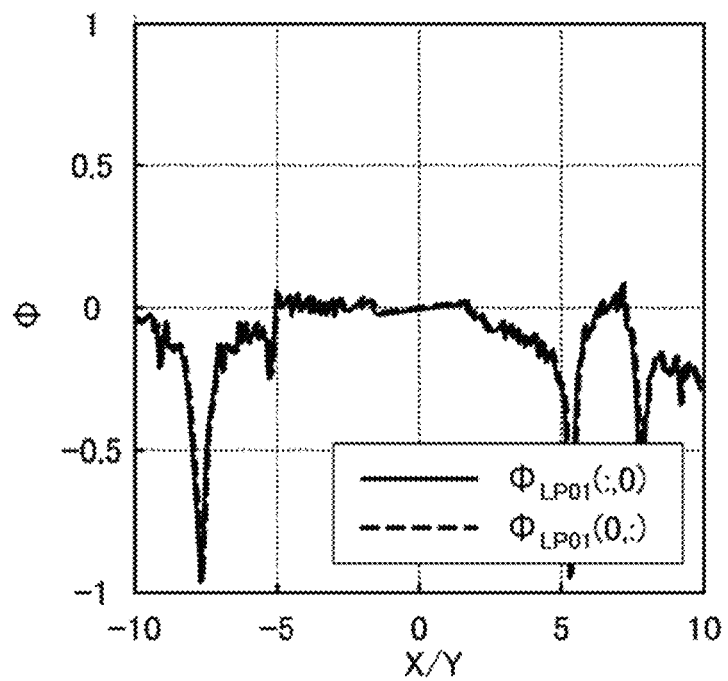
FIG. 10A is a diagram for describing an operation of the control amount calculation unit included in the optical receiving device according to the second example embodiment of the present invention, and is a diagram illustrating a result shown by plotting the relative phase in the $LP_{01}$ mode with respect to a control amount.
Figure 10B:
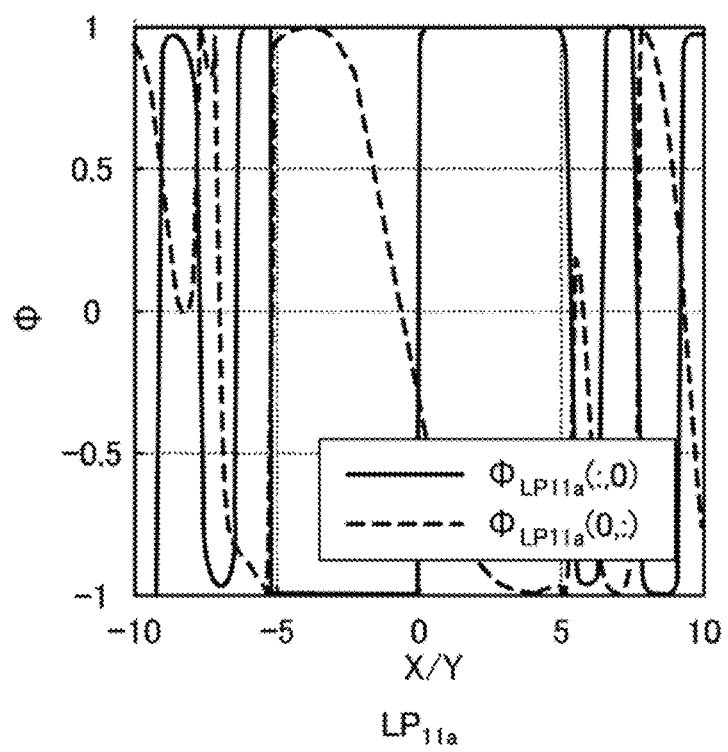
FIG. 10B is a diagram for describing an operation of the control amount calculation unit included in the optical receiving device according to the second example embodiment of the present invention, and is a diagram illustrating a result shown by plotting the relative phase in the $LP_{11a}$ mode with respect to a control amount.
Figure 10C:
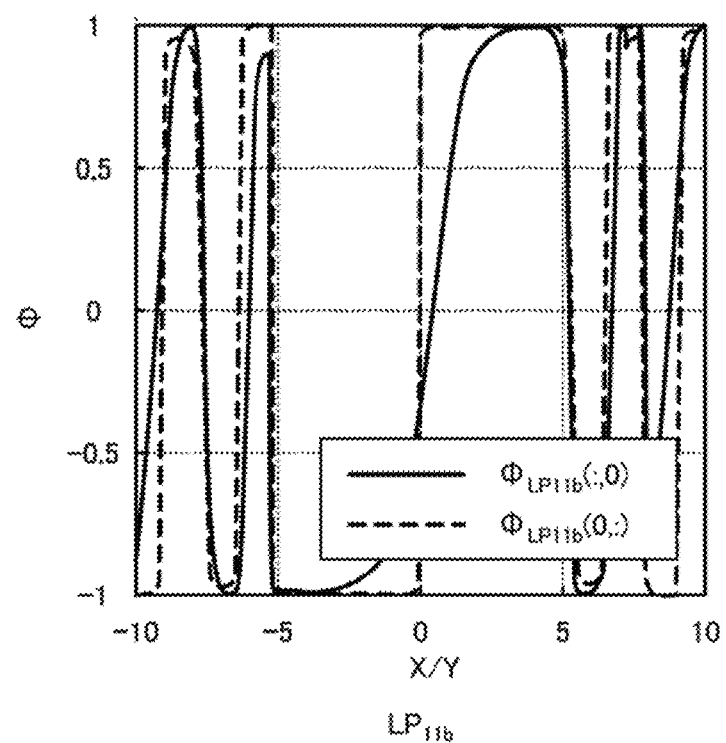
FIG. 10C is a diagram for describing an operation of the control amount calculation unit included in the optical receiving device according to the second example embodiment of the present invention, and is a diagram illustrating a result shown by plotting the relative phase in the $LP_{11b}$ mode with respect to a control amount.

Further, each of FIGS. 10A to 10C illustrates a result acquired by plotting a change of the relative phase in each LP mode with respect to the control amount in the X-axis or the Y-axis. In each drawing, the vertical axis indicates a relative phase $\Phi$ after subjecting the relative phase to cosine (cos) calculation, and takes a value from −1 to +1. Further, the solid line indicates a change of the relative phase $\Phi$ with respect to the control amount in the X-axis when Y=0 is satisfied, that is, a change of the relative phase D when the mirror is rotated about the X-axis with a rotation amount about the Y-axis being 0. Meanwhile, the broken line indicates a change of the relative phase $\Phi$ with respect to the control amount in the Y-axis when X=0 is satisfied, that is, a change of the relative phase $\Phi$ when the mirror is rotated about the Y-axis with a rotation amount about the X-axis being 0.

When the changes of the coupling phases (FIGS. 7B, 7C, 8B, and 8C) and the changes of the relative phases (FIGS. 9B, 9C, 10B, and 10C) relating to the $LP_{11a/b}$ modes are compared with each other, it is understood that, when the relative phase is used, the area near the center, where the information relating to a sign (positive or negative) of the shift of the control amount can be appropriately acquired, is increased.

As described above, it is understood that the light intensity of the mode optical beam coupled in each mode and the relative phase after conversion with the basic mode as a reference can be used as feature amounts for optimally controlling the mirror included in the optical system.

The example embodiment described above adopts a configuration in which the optical system includes the mirror and the rotation amount of the mirror about the axis is used as the control amount of the variable mechanism. However, the example embodiment is not limited thereto, and a spatial optical phase modulator or a mirror having a variable shape (deformable mirror) may be used in place of the mirror. In this case, a pair (x1, x2, . . . , xN) of modulation amounts of elements (pixels or actuators) may be regarded as a control amount.

The whole or part of the example embodiments disclosed above can be described as, but not limited to, the following supplementary notes.

(Supplementary Note 1)

A receiving optical system control device including: a light intensity calculation means for calculating light intensity of each mode optical beam from a reception signal acquired by receiving, for each mode optical beam, a plurality of mode optical beams being incident optical beams coupled to a plurality of propagation modes of an optical transmission medium by an optical system including a variable mechanism; an optical phase calculation means for calculating an optical phase of each of the mode optical beams from the reception signal; a relative phase calculation means for calculating a relative phase between the plurality of mode optical beams from the optical phase; and a control amount calculation means for calculating a control amount of the variable mechanism from the light intensity and the relative phase.

(Supplementary Note 2)

The receiving optical system control device according to Supplementary Note 1, wherein the control amount calculation means calculates the control amount for maximizing total coupling efficiency being a total sum of coupling efficiency of the incident optical beams to each of the plurality of propagation modes.

(Supplementary Note 3)

The receiving optical system control device according to Supplementary Note 1 or 2, wherein the relative phase calculation means calculates the relative phase with a phase in a basic mode as a reference among the plurality of mode optical beams.

(Supplementary Note 4)

The receiving optical system control device according to any one of Supplementary Notes 1 to 3, wherein the control amount calculation means models a relationship between the light intensity and the relative phase, and the control amount by a neural network, and calculates the control amount by using a parameter indicating coupling between an input layer and an output layer when the light intensity and the relative phase are regarded as the input layer, and a selection probability of an adjustment amount with respect to the control amount is regarded as the output layer.

(Supplementary Note 5)

The receiving optical system control device according to Supplementary Note 4, wherein the control amount calculation means optimizes the parameter by reinforcement learning.

(Supplementary Note 6)

The receiving optical system control device according to Supplementary Note 5, wherein the control amount calculation means uses, as a reward of the reinforcement learning, total coupling efficiency being a total sum of coupling efficiency of the incident optical beams to each of the plurality of propagation modes.

(Supplementary Note 7)

A receiving optical system control method including: acquiring a reception signal by receiving, for each mode optical beam, a plurality of mode optical beams being incident optical beams coupled to a plurality of propagation modes of an optical transmission medium by an optical system including a variable mechanism; calculating light intensity of each of the mode optical beams from the reception signal; calculating an optical phase of each of the mode optical beams from the reception signal; calculating a relative phase between the plurality of mode optical beams from the optical phase; and calculating a control amount of the variable mechanism from the light intensity and the relative phase.

(Supplementary Note 8)

The receiving optical system control method according to Supplementary Note 7, wherein the calculating the control amount includes calculating the control amount for maximizing total coupling efficiency being a total sum of coupling efficiency of the incident optical beams to each of the plurality of propagation modes.

(Supplementary Note 9)

The receiving optical system control method according to Supplementary Note 7 or 8, wherein the calculating the relative phase includes calculating the relative phase with a phase in a basic mode as a reference among the plurality of mode optical beams.

(Supplementary Note 10)

The receiving optical system control method according to any one of Supplementary Notes 7 to 9, wherein the calculating the control amount includes: modeling a relationship between the light intensity and the relative phase, and the control amount by a neural network, regarding the light intensity and the relative phase as an input layer, regarding a selection probability of an adjustment amount with respect to the control amount as an output layer, and calculating the control amount by using a parameter indicating coupling between the input layer and the output layer; optimizing the parameter by reinforcement learning; and using, as a reward of the reinforcement learning, total coupling efficiency being a total sum of coupling efficiency of the incident optical beams to each of the plurality of propagation modes.

(Supplementary Note 11)

The receiving optical system control device according to any one of Supplementary Notes 1 to 6, wherein the relative phase calculation means performs cosine calculation on a relative phase between the plurality of mode optical beams, and regards the resultant as the relative phase.

(Supplementary Note 12)

The receiving optical system control device according to any one of Supplementary Notes 4 to 6, wherein the control amount calculation means uses a normalized linear function as an activating function of a hidden layer of the neural network, and uses a Softmax function as an activating function of the output layer.

(Supplementary Note 13)

The receiving optical system control device according to Supplementary Note 5 or 6, wherein the control amount calculation means uses a policy gradient method as the reinforcement learning.

(Supplementary Note 14)

An optical receiving device including: the receiving optical system control device according to any one of Supplementary Notes 1 to 6 and 11 to 13; the optical system; the optical transmission medium; a coupling control means for controlling the variable mechanism, based on the control amount, and coupling the incident optical beams to the plurality of propagation modes; a mode demultiplexing means for demultiplexing the plurality of mode optical beams and outputting each of the mode optical beams; and an optical receiving means for receiving each of the mode optical beams and generating the reception signal.

(Supplementary Note 15)

The optical receiving device according to Supplementary Note 14, wherein the optical system includes a mirror, the variable mechanism rotates the mirror about an axis, and the control amount indicates a rotation amount of the mirror about the axis.

(Supplementary Note 16)

The optical receiving device according to Supplementary Note 14 or 15, wherein the optical transmission medium is a few-mode fiber.

(Supplementary Note 17)

The optical receiving device according to any one of Supplementary Notes 14 to 16, wherein the optical receiving means performs coherence detection by causing each of the mode optical beams and a local oscillation optical beam to interfere with each other.

(Supplementary Note 18)

The receiving optical system control method according to any one of Supplementary Notes 7 to 10, wherein the calculating the relative phase includes regarding a result acquired by performing cosine calculation on a relative phase between the plurality of mode optical beams, as the relative phase.

(Supplementary Note 19)

The receiving optical system control method according to Supplementary Note 10, wherein the calculating the control amount includes using a normalized linear function as an activating function of a hidden layer of the neural network, and using a Softmax function as an activating function of the output layer.

(Supplementary Note 20)

The receiving optical system control method according to Supplementary Note 10, wherein the calculating the control amount includes using a policy gradient method as the reinforcement learning.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2019-102288, filed on May 31, 2019, the disclosure of which is incorporated herein in its entirety by reference.

REFERENCE SIGNS LIST

100 Receiving optical system control device
110 Light intensity calculation unit
120 Optical phase calculation unit
130 Relative phase calculation unit
140 Control amount calculation unit
1000 Optical receiving device
1100 Optical system
1101 Variable mechanism
1200 Optical transmission medium
1300 Coupling control device
1400 Mode demultiplexer
1500 Optical receiver
1501 Local oscillator
1600 Signal processing device
1610 Light intensity calculation unit
1620 Optical phase calculation unit
1630 Relative phase calculation unit
1700 Control amount calculation unit
1800 Analog-to-digital converter

What is claimed is:

1. A receiving optical system control device comprising:
a light intensity calculation unit configured to calculate light intensity of each mode optical beam from a reception signal acquired by receiving, for each mode optical beam, a plurality of mode optical beams being incident optical beams coupled to a plurality of propagation modes of an optical transmission medium by an optical system including a variable mechanism;

an optical phase calculation unit configured to calculate an optical phase of each of the mode optical beams from the reception signal;

a relative phase calculation unit configured to calculate a relative phase between the plurality of mode optical beams from the optical phase; and a control amount calculation unit configured to calculate a control amount of the variable mechanism from the light intensity and the relative phase.

2. The receiving optical system control device according to claim 1, wherein the control amount calculation unit calculates the control amount for maximizing total coupling efficiency being a total sum of coupling efficiency of the incident optical beams to each of the plurality of propagation modes.

3. The receiving optical system control device according to claim 1, wherein the relative phase calculation unit calculates the relative phase with a phase in a basic mode as a reference among the plurality of mode optical beams.

4. The receiving optical system control device according to claim 1, wherein the control amount calculation unit models a relationship between the light intensity and the relative phase, and the control amount by a neural network, and calculates the control amount by using a parameter indicating coupling between an input layer and an output layer when the light intensity and the relative phase are regarded as the input layer, and a selection probability of an adjustment amount with respect to the control amount is regarded as the output layer.

5. The receiving optical system control device according to claim 4, wherein the control amount calculation unit optimizes the parameter by reinforcement learning.

6. The receiving optical system control device according to claim 5, wherein the control amount calculation unit uses, as a reward of the reinforcement learning, total coupling efficiency being a total sum of coupling efficiency of the incident optical beams to each of the plurality of propagation modes.

7. The receiving optical system control device according to claim 5, wherein the control amount calculation unit uses a policy gradient method as the reinforcement learning.

8. The receiving optical system control device according to claim 4, wherein the control amount calculation unit uses a normalized linear function as an activating function of a hidden layer of the neural network, and uses a Softmax function as an activating function of the output layer.

9. The receiving optical system control device according to claim 1, wherein the relative phase calculation unit performs cosine calculation on a relative phase between the plurality of mode optical beams, and regards the resultant as the relative phase.

10. A receiving optical system control method comprising:

acquiring a reception signal by receiving, for each mode optical beam, a plurality of mode optical beams being incident optical beams coupled to a plurality of propagation modes of an optical transmission medium by an optical system including a variable mechanism;

calculating light intensity of each of the mode optical beams from the reception signal;

calculating an optical phase of each of the mode optical beams from the reception signal;

calculating a relative phase between the plurality of mode optical beams from the optical phase; and calculating a control amount of the variable mechanism from the light intensity and the relative phase.

11. The receiving optical system control method according to claim 10, wherein the calculating the control amount includes calculating the control amount for maximizing total coupling efficiency being a total sum of coupling efficiency of the incident optical beams to each of the plurality of propagation modes.

12. The receiving optical system control method according to claim 10, wherein the calculating the relative phase includes calculating the relative phase with a phase in a basic mode as a reference among the plurality of mode optical beams.

13. The receiving optical system control method according to claim 10, wherein the calculating the control amount includes:

modeling a relationship between the light intensity and the relative phase, and the control amount by a neural network, regarding the light intensity and the relative phase as an input layer, regarding a selection probability of an adjustment amount with respect to the control amount as an output layer, and calculating the control amount by using a parameter indicating coupling between the input layer and the output layer;

optimizing the parameter by reinforcement learning; and using, as a reward of the reinforcement learning, total coupling efficiency being a total sum of coupling efficiency of the incident optical beams to each of the plurality of propagation modes.

14. The receiving optical system control method according to claim 13, wherein the calculating the control amount includes using a normalized linear function as an activating function of a hidden layer of the neural network, and using a Softmax function as an activating function of the output layer.

15. The receiving optical system control method according to claim 13, wherein the calculating the control amount includes using a policy gradient method as the reinforcement learning.

16. The receiving optical system control method according to claim 10, wherein the calculating the relative phase includes regarding a result acquired by performing cosine calculation on a relative phase between the plurality of mode optical beams, as the relative phase.

17. An optical receiving device comprising:

a receiving optical system control device including a light intensity calculation unit configured to calculate light intensity of each mode optical beam from a reception signal acquired by receiving, for each mode optical beam, a plurality of mode optical beams being incident optical beams coupled to a plurality of propagation modes of an optical transmission medium by an optical system including a variable mechanism;

an optical phase calculation unit configured to calculate an optical phase of each of the mode optical beams from the reception signal;

a relative phase calculation unit configured to calculate a relative phase between the plurality of mode optical beams from the optical phase; and a control amount calculation unit configured to calculate a control amount of the variable mechanism from the light intensity and the relative phase;

the optical system;

the optical transmission medium;

a coupling control unit configured to control the variable mechanism, based on the control amount, and couple the incident optical beams to the plurality of propagation modes;

a mode demultiplexing unit configured to demultiplex the plurality of mode optical beams and outputting output each of the mode optical beams; and an optical receiving unit configured to receive each of the mode optical beams and generate the reception signal.

18. The optical receiving device according to claim 17, wherein the optical system includes a mirror, the variable mechanism rotates the mirror about an axis, and the control amount indicates a rotation amount of the mirror about the axis.

19. The optical receiving device according to claim 17, wherein the optical transmission medium is a few-mode fiber.

20. The optical receiving device according to claim 17, wherein the optical receiving unit performs coherence detection by causing each of the mode optical beams and a local oscillation optical beam to interfere with each other.

* * * * *